(12) United States Patent
Blase

(10) Patent No.: US 7,669,402 B2
(45) Date of Patent: Mar. 2, 2010

(54) JOINT ELEMENT FOR AN ENERGY GUIDING CHAIN

(75) Inventor: Gunter Blase, Bergisch Gladbach (DE)

(73) Assignee: Igus GmbH, Cologne, DE (US)

( * ) Notice: Subject to any disclaimer, the term of this patent is extended or adjusted under 35 U.S.C. 154(b) by 427 days.

(21) Appl. No.: 11/764,320

(22) Filed: Jun. 18, 2007

(65) Prior Publication Data

US 2008/0072564 A1 Mar. 27, 2008

(30) Foreign Application Priority Data

Jun. 17, 2006 (DE) .................. 20 2006 009 482 U

(51) Int. Cl.
*F16G 13/00* (2006.01)
(52) U.S. Cl. .............................. 59/78.1; 248/49; 59/900
(58) Field of Classification Search ...................... 59/78, 59/78.1, 900; 248/49, 51
See application file for complete search history.

(56) References Cited

U.S. PATENT DOCUMENTS

| 6,354,070 | B1 | 3/2002 | Blase |
| 6,745,555 | B2 | 6/2004 | Hermey et al. |
| 6,864,425 | B2* | 3/2005 | Ikeda et al. ................... 59/78.1 |
| 7,047,720 | B2* | 5/2006 | Ikeda et al. ................... 59/78.1 |
| 7,426,823 | B2* | 9/2008 | Blase et al. ................... 59/78.1 |
| 2003/0000198 | A1 | 1/2003 | Hermey et al. |
| 2004/0222002 | A1 | 11/2004 | Ikeda et al. |
| 2005/0274850 | A1 | 12/2005 | Blase et al. |
| 2006/0112670 | A1 | 6/2006 | Blase et al. |

FOREIGN PATENT DOCUMENTS

EP 0063533 10/1982

(Continued)

OTHER PUBLICATIONS

German Search Report dated Jan. 31, 2008, received in corresponding German priority application No. 20 2006 009 482.2, 4 pgs.

(Continued)

*Primary Examiner*—David B Jones
(74) *Attorney, Agent, or Firm*—Grossman Tucker Perreault & Pfleger, PLLC

(57) ABSTRACT

The invention relates to a joint element for an energy guiding chain for guiding hoses or cables, with a number of chain links displaying opposite side straps, where upper and lower cross-members are provided on at least some of the side straps, where the joint element displays at least two mounting areas that can be connected to adjacent or spaced chain links in order to connect them to each other in articulated fashion, so that the energy guiding chain can be deposited to form a lower strand, a deflection zone and an upper strand. The joint element is developed in that an element is provided on it that is made of a material having greater conductivity than the joint element material and continuously bridges the at least two mounting areas. The bridging element displays at least two contact areas located on the surface of the joint element, each of which can be connected in electrically contacting fashion to the two chain links associated with the two mounting areas. As a result, the energy guiding chain displays a long service life, even when exposed to very great mechanical stresses, can be used in ESD protection zones, and has no tendency towards electrostatic charging.

25 Claims, 7 Drawing Sheets

FOREIGN PATENT DOCUMENTS

FR        1377299        11/1964

OTHER PUBLICATIONS

Engineering standard EN 61340-5-1 in German Language, referred to in Specification, p. 1, paragraph 2.

Engineering standard DIN IEC 61340-5-1 with English language version included, referred to in Specification, p. 1, paragraph 2.

International Search Report dated Oct. 9, 2007, received in corresponding application No. PCT/DE07/01072, 2 pgs.

* cited by examiner

Fig. 4

Fig. 4b 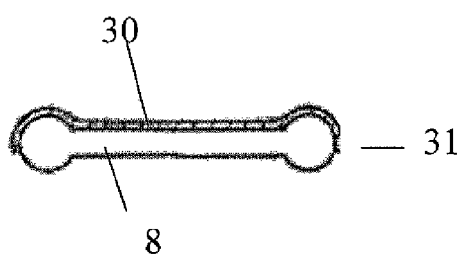 Fig. 4b' 
Fig. 4c 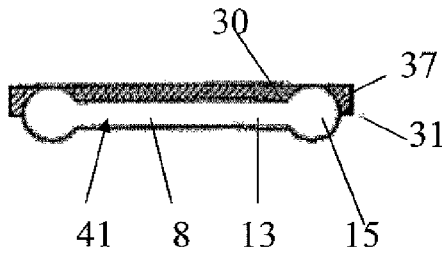 Fig. 4c' 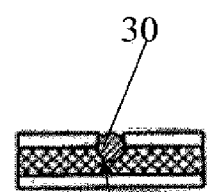
Fig. 4d 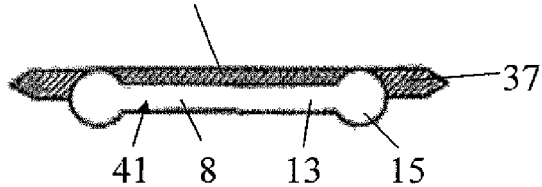 Fig. 4d' 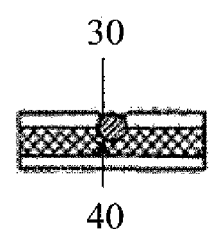
Fig. 4e 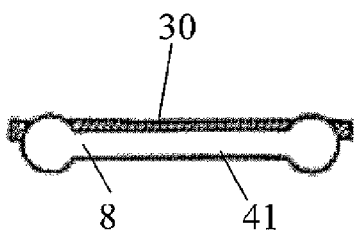 Fig. 4e' 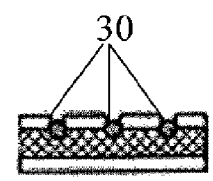

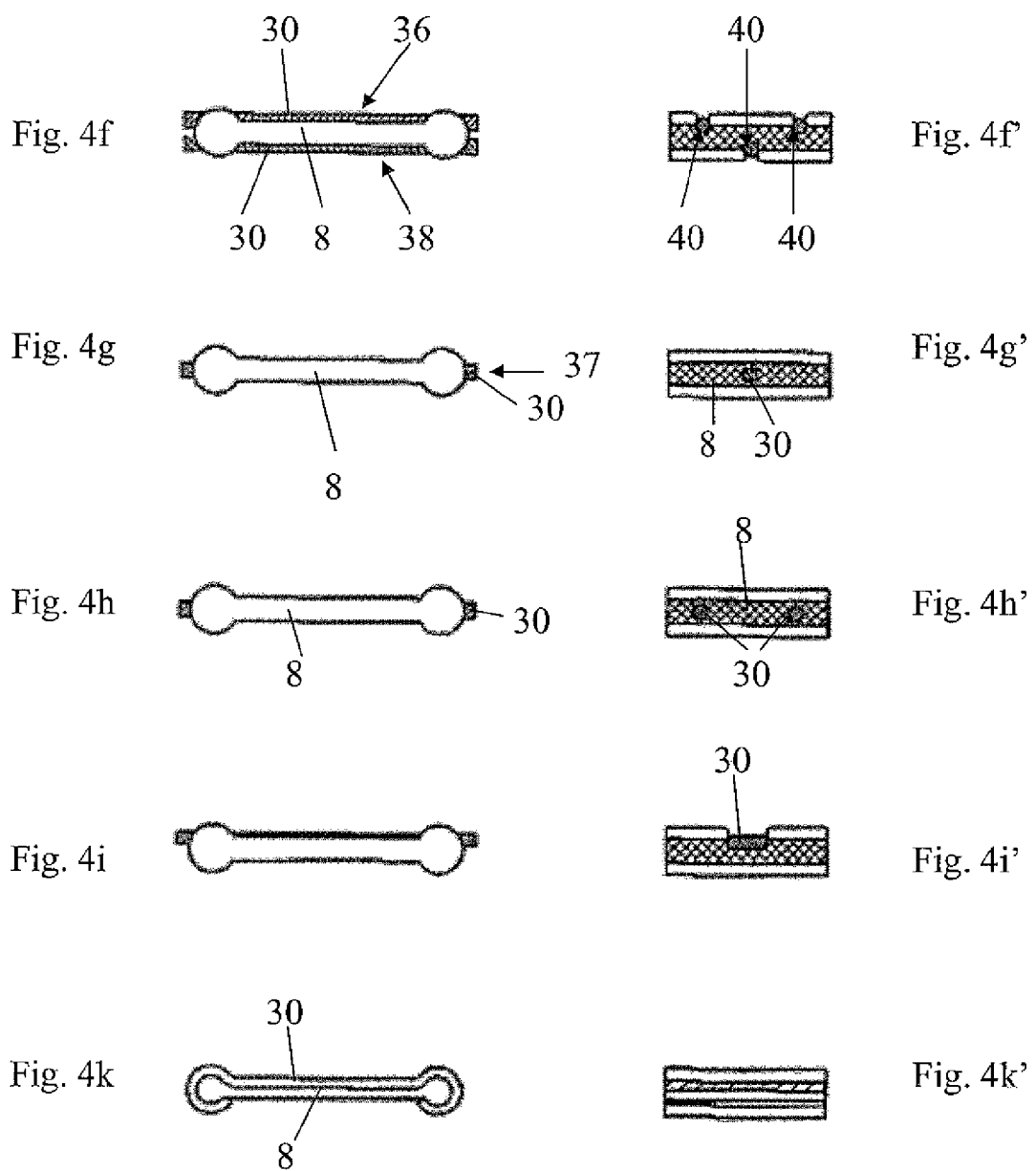

JOINT ELEMENT FOR AN ENERGY GUIDING CHAIN

The invention relates to a joint element for an energy guiding chain, and an energy guiding chain with a joint.

Energy guiding chains are known that are designed according to EN 61340-5-1 or other comparable technical standards for use in ESD protection zones. In chains of this kind, electrical charges are discharged via the chain in order to avoid electrostatic charges that are disruptive for the respective application, e.g. in the production of electronic components. Therefore, the joint elements of energy guiding chains of this kind must not only withstand the otherwise customary, great mechanical stresses occurring, such as tensile, bending and/or torsional stresses, particularly in the event of high number of load cycles, as well as demonstrating a very long service life; they must also permit the most effective possible discharge of electrical charges, or additional discharge elements must be provided. There continues to be a need to provide energy guiding chains and joint elements that fulfill these partially contradictory requirements profiles in particularly optimal fashion. For example, the electrical conductivity of the joint elements can be increased by electrically conductive fillers, such as graphite, metal powder or the like, but this has a negative impact on the mechanical properties of the joint elements, such as their elasticity, breaking strength, tensile strength, etc. Electrically conductive coatings on the joint elements, produced by vapor deposition, for example, usually display only low or inadequate adhesion and conductivity on the plastic material of the joint element, and are highly susceptible to damage. Assembly of the joint elements, or their replacement, thus entails difficulties. The provision of separate discharge devices is highly complicated.

The object of the invention is thus to create an energy guiding chain that displays a long service life even when exposed to very great mechanical stresses, that can be used in ESD protection zones, and that displays a particularly low tendency towards electrostatic charges. Moreover, the object is to provide a joint element for an energy guiding chain of this kind.

The object is solved by an energy guiding chain and a corresponding joint element according to independent claims 1 and 21. Advantageous embodiments are revealed in the sub-claims.

Due to the fact that the joint element is provided with an additional bridging element, which extends continuously between the two mounting areas of the joint element and displays areas on the surface that can be contacted electrically by the chain links to be connected by the joint element, an energy guiding chain can be provided that can be exposed to particularly great mechanical stresses and enables particularly rapid and complete discharge of electrostatic charges.

The bridging element advantageously projects beyond the joint element, in the longitudinal direction and/or vertically, i.e. upwards or downwards, and/or laterally, and can thus be connected to the respective chain link is electrically contacting fashion. Generally, the contacting area is in each case preferably disposed in such a way that, towards the inside of the chain and/or the outside of the chain, it is mechanically shielded and protected by the joint element and/or by the adjacent area of the chain link assigned to it. The mechanical shielding can be provided by an inner or outer side of the side straps of the chain links that faces towards or away from the inside of the chain or the outside of the chain, and/or by an upper or lower side of the cross-members that faces towards the inside of the chain or the outside of the chain, and/or by the lower and/or upper side of a joint element connecting the chain links in assembled position. The bridging element can thus rest against an area of a side strap or a cross-member located within said component, or be shielded by said area. Alternatively, the bridging element can be embedded in the joint element, the side straps and/or the cross-members.

The bridging element is preferably fastened to the joint element in such a way that the bridging element is pre-assembled, or that the two elements can be handled as a structural unit and fastened to the chain links. The bridging element can be fixed on the joint element positively and/or non-positively and/or by bonding. For example, the bridging element can be inserted, at least partly or over its entire length, in groove-like recesses in the joint element, forming a non-positive and/or positive connection. Where appropriate, the bridging element can—except for the contacting areas—also be surrounded by the joint element, e.g. by molding-in, if the joint element is produced by an injection molding process.

Particularly preferably, the contacting areas of the bridging element do not change position relative to the chain links connected by the joint element when the chain links are pivoted relative to each other. Particularly preferably, the mounting areas of the joint elements do not change position relative to the bridging elements connecting them when the chain links are pivoted relative to each other.

In assembled position of the joint element, bridging elements are preferably provided on the upper and lower side of the joint element, in each case being connectable or connected to the chain link in electrically contacting fashion. This ensures particularly favorable discharge of electrostatic charges from the upper and lower area of the respective chain link. Moreover, the bridging elements can have smaller dimensions than in the event of provision on only one side of the joint element, meaning that associated recesses in the joint element for accommodating corresponding bridging elements can also have smaller dimensions, this increasing the mechanical stability and durability of the joint element.

Bridging elements located on the upper and lower side of the joint element are preferably arranged in offset fashion relative to each other, thereby increasing the mechanical stability of the joint element. Independently hereof, the number and/or cross-sectional area of the bridging elements located on the upper and lower side of the joint element can be different, particularly if the joint element is not positioned half way up the side straps, meaning that electrostatic charges can occur to different degrees above and below the joint element. It goes without saying that a larger number of bridging elements and/or bridging elements of larger diameter can be assigned to the taller area of the strap.

Due to the fact that the bridging elements project from the joint element, particularly in relation to its height and/or length, or also laterally, particularly simple electrical contacting with the respective contact areas of the chain link is possible at these points. In this context, it is sufficient if the bridging element merely projects from partial areas of the joint element, e.g. in the area of the mounting area.

Furthermore, the bridging element can simultaneously serve to fix the joint element on the chain link, particularly on its side straps, in laterally immovable fashion. This can also be done in addition to other associated fastening means, such as snap-in and/or frictionally engaged means. For example, the bridging element can be located in a recess in the joint element that is closed in the transverse direction of the chain, e.g. in a groove or channel that is open towards the top or bottom, where the opposite connecting area of the side strap can likewise be provided with a recess to accommodate the bridging element, the two together forming a receiving space for it. This simultaneously achieves particularly good electrical contact.

On the other hand, the bridging element can also project from the joint element at one or both ends, particularly at the face end. The projecting areas can be connected or connectable to the respectively associated chain link, or to its side strap, in electrically contacting fashion. The projecting areas can display different geometries. Preferably, contacting is again accomplished on the periphery of the bridging elements in this case.

The bridging element can be designed as a wire or strip. The bridging element can have a diameter or height of $\geq 0.05$ mm or $\geq 0.1$-$0.2$ mm, or also $\geq 0.3$ mm where appropriate, e.g. approx. 0.5 mm, but preferably $\leq 0.6$-$0.8$ mm or $\leq 1$-$2$ mm. Where appropriate, the bridging element can also be made up of several sub-elements extending alongside each other, e.g. in the manner of a wire comprising several strands, in order to achieve a desired flexural strength.

The joint element can connect just two, or also several, chain links to each other in articulated fashion, and preferably extend over the entire length of the energy guiding chain. The same also applies to the electrically conductive connection of the chain links of the energy guiding chain by the bridging element. In this context, the joint element and the bridging element can also extend over a different number of chain links, or connect them to each other in electrically conductive fashion. Thus, a joint element extending over several chain links or the entire chain can encompass several bridging elements, arranged one behind the other in the longitudinal direction of the chain, each of which interconnects only a small number or groups of chain links in electrically conductive fashion, e.g. only adjacent links in each case.

If each joint element connects more than two chain links to each other, connecting areas displaying a smaller width than the straps and/or than the elastically deformable areas of the joint elements can in each case be provided between the mounting areas of the joint elements, by means of which they are connected to the two adjacent chain links. As a result, the joint elements extending over several straps can be handled as one piece. The connecting areas can be located in the cross-sectional area of the straps. The bridging elements are preferably supported by the connecting areas, or surrounded by them. The areas of the straps located above and below the joint elements can be connected by a web in this context, such that the straps are of one-piece design.

The bridging element can also in each case be surrounded by the joint element, over part of its length or a plurality of sections, or also virtually over its entire length, e.g. by the joint element being molded around the bridging element. It has been found in this context that this arrangement also increases the service life of the bridging element, since bending and/or torsional stresses resulting from traversing of the energy guiding chain are absorbed by the joint element.

The straps and the joint elements can consist of different materials, particularly different plastic materials. The elastic properties of the joint element are preferably set in such a way that the joint element remains in the elastic range under any normal bending stress and, in the event of deformation, exerts elastic restoring forces on the straps connected by the joint element. The material of the straps can guarantee particularly great dimensional stability (against tensile, torsional and/or compressive forces) and high flexural strength of the straps, and also of the chain links as a whole. The material can particularly display low sliding friction, this facilitating traversing of the energy guiding chain with the upper strand sliding on the lower strand.

If the straps and the joint elements are designed as separate components, the straps can be designed in such a way that they absorb virtually all the compressive and tensile forces acting on the stretched energy guiding chain in the longitudinal direction, while the function of the joint elements is limited exclusively to the creation of hinge joints subject to no significant stressing by compressive and tensile forces.

The joint element preferably extends fully between the inner and outer side surface of the straps. The joint elements can have a width corresponding exactly to the width of the straps at the height of the joint elements, or they can display a smaller or larger width.

The chain links can in each case display an upper and a lower cross-member, delimiting the space between the opposite straps towards the outside, where one of the cross-members can also be designed as a split cross-member. Chain links not displaying cross-members can also be provided. Preferably, at least one of the cross-members is designed to be resistant to bending and fastened on the opposite straps in non-bending fashion.

When the assembled energy guiding chain is in stretched position, the joint element can be vertically located between the upper and the lower cross-member, if present, or between the fastening elements for cross-members and at a vertical distance from the cross-members, particularly in a middle area of the strap height that is a distance of more than one-quarter of the strap height from the bottom edge of the strap. In particular, the joint element can be positioned half way up the strap. As a result, the chain links can be arranged symmetrically about the neutral line of the energy guiding chain, where the neutral line undergoes no change in length when the chain is deflected from the stretched position into the curved position. The guided lines are thus stressed more uniformly during angling movement of the energy guiding chain.

The joint elements are particularly preferably designed as spring elements that exert elastic restoring forces on the adjacent chain links when the chain links are angled out of the position when the energy guiding chain is stretched. The elastic restoring forces preferably exert a return movement of the chain links over the entire pivoting angle of the chain links. The restoring forces can bring about automatic return movement of the chain links up to their stop position when the energy guiding chain is stretched. This can apply to the unloaded energy guiding chain, and also to a partly or maximally loaded energy guided chain.

The joint elements and/or bridging elements can be designed in a variety of forms. They can display a varying cross-section and/or areas of different material thickness between the mounting areas. The cross-section and/or the material thickness can increase a distance away from the mounting areas and, for example, reach their maximum in the middle area of the joint element, or they can also decrease or vary in some other way. The joint elements, in particular, can also display an area of thinner material in the middle area. The cross-section and/or material thickness preferably varies in the principal plane of the associated chain straps. This makes it possible to set the traversing properties of the energy guiding chain, e.g. the force necessary for angling the straps. The bridging elements can likewise display a cross-sectional shape that varies over their length, e.g. in order to adjust their electrical conductivity and/or mechanical properties. This is particularly important in the case of interchangeable joint elements.

The chain links can in each case be provided with contact faces that act continuously on the joint element and/or the bridging element over the entire pivoting angle. The joint element is preferably located between the associated contact faces of the straps by means of an interference fit, to which end the straps can be provided with slit-type receptacles. The contact faces of the straps and the corresponding faces of the joint element are preferably plane surfaces, whose normals lie parallel to the inner and outer side surface of the straps and which are perpendicular to the longitudinal direction of the energy guiding chain when the latter is in stretched position. At the same time, the bridging element is also preferably pressed against the joint element by a pressure force, where pressure force can essentially be exerted by the contact faces of the straps, which otherwise exert pressure on the joint element.

The joint element can be designed as a plate-type component, which can also be a strip-type component. For example, the joint element can display essentially plane upper and lower sides facing towards the upper and lower sides of the straps. Areas of the chain straps preferably rest against the upper and/or lower side of the plane areas of the joint elements. The joint element can also be designed as a component that is curved in the plane parallel to the inner and outer side surface of the straps, such that, when fitted in the straps in longitudinally straight position, it results in prestress in an angling direction, or have other suitable cross-sections. The bridging element can likewise be curved or straight.

The joint element can act on both adjacent side straps by means of mounting areas, which absorb tensile forces acting in the longitudinal direction of the energy guiding chain. To this end, the joint element can be fastened to the adjacent straps non-positively, positively and/or by bonding. The tension-absorbing mounting of the joint elements on the straps can be designed in such a way that it is only intended for low tensile forces, e.g. to facilitate assembly of the energy guiding chain. To this end, the mounting areas of the joint elements can display projections on the upper and lower side—preferably on the free ends facing away from the elastically deformable areas—which can extend over the entire width of the joint elements. If necessary, additional tension-absorbing means can be provided to absorb higher tensile forces.

The joint elements are preferably located in recesses in the chain straps. At the face end, the recesses are preferably open towards the adjacent strap connected by the respective joint element. Additionally or alternatively, and regardless of the length of the joint elements, the recesses in the chain straps that accommodate the joint elements can be open on the side surfaces facing towards or away from the inside of the energy guiding chain, so that the joint elements can be inserted into the recesses and fastened to the straps in a direction that is transverse, preferably perpendicular, to the principal plane or the side surfaces of the straps.

The joint element can be connected to the straps in non-positive, positive and/or bonded fashion to prevent it from disconnection from the straps perpendicular to the principal plane of the straps and/or from torsion transverse to the straps, particularly if the joint element is located in a laterally open recess in the straps.

It is preferable in each case for at least one of two adjacent straps, preferably both, to have a recess at the height of the joint element on the face end associated with the adjacent strap, which is open at the face end and through which the joint element extends. Based at least on the stretched position of the energy guiding chain, the recess extends on the side of the joint elements facing the angling direction of the links, preferably on both sides of the joint elements. This enables bending of the joint element, where the middle area of the elastically deformable area of the joint element has a slight vertical offset relative to the two adjacent straps during the pivoting movement.

Adjacent straps preferably display interacting means that absorb compressive and/or tensile forces acting on the energy guiding chain. This relieves the compressive and/or tensile forces acting on the connecting areas between the joint elements and the straps, and thus also on the bridging elements. The means that absorb the compressive and/or tensile forces are preferably designed as corresponding projections and undercuts, particularly in the form of recesses in adjacent straps. The corresponding areas of adjacent straps that absorb tensile and/or compressive forces can also be designed as corresponding stops that limit the pivoting angle of adjacent chain links relative to each another.

The joint element can alternatively also be designed as a joint strip that is fastened to the cross-members of the chain links, e.g. on the inner or outer side thereof, or generally to the undersides of the chain links. In this context, the joint element can be designed in such a way that, when the upper strand is deposited on the lower strand, the joint strip serves as a supporting surface and is thus ultimately deposited on itself. The bridging element is preferably located on the side of the joint element facing towards the cross-member, connected to it in electrically contacting fashion, and thus shielded against external influences by the joint element.

Where appropriate, the bridging element can have a greater actual length than the associated section of the joint element, e.g. in the form of deflected areas passing around the joint element in looping or meandering fashion. As a result, changes in length of the bridging element occurring during traversing of the energy guiding chain can be absorbed, thereby increasing its service life. This is particularly also true in the case of joint elements exposed to torsional stresses, where the bridging element can also surround the joint element in spiral form. In this context, the joint element can, for example, be designed as a kind of pivot pin, the end areas of which are located in non-rotating fashion on the side straps of adjacent, preferably overlapping links.

The bridging element can generally be fastened to the joint element in detachable fashion, but also connected to it in one piece, where appropriate.

The connection between the joint element and the bridging element is preferably designed in such a way that it compensates for changes in length of at least one of the two elements, while maintaining constant contact between them, e.g. by means of a suitable design of a non-positive connection.

An example of the invention is described below and explained on the basis of the Figures. The Figures show the following:

FIG. 1 A perspective view of an energy guiding chain according to the invention, FIG. 2 A detail view of the straps of the energy guiding chain according to FIG. 1, FIG. 3 A perspective view of a further embodiment of an energy guiding chain according to the invention, FIG. 4 Side views and face-end views of various embodiments of joint elements, and FIG. 5 A side view (FIG. 5a) and a sectional view (FIG. 5b) of a further embodiment of an energy guiding chain according to the invention.

Energy guiding chain 1 according to the invention, shown in FIG. 1, comprises a plurality of chain links 2, which are connected to each other in articulated fashion and each of which comprises two straps 3, which are arranged parallel to each other, of mirror-symmetrical design, and connected by an upper and a lower cross-member 4a, 4b. Cross-members 4a, 4b can be fastened to straps 3 in detachable fashion by snap-in means. The dimensionally stable straps and at least one rigid cross-member, which is fastened stably to the straps, form dimensionally stable, torsion-proof chain links. At least one of the cross-members can allow at least partial access to the inside of the energy guiding chain, in order to allow the hoses, cables or the like to be guided to be arranged in the guide channel of the energy guiding chain defined by the straps and the cross-members. The energy guiding chain shown can be arranged in curved fashion, forming a lower strand 7, of which only one strap of the first chain link is shown, a deflection zone 6, and an upper strand 5.

Chain links 2 are connected to each other by joint elements 8, which in this instance each connect exactly two adjacent straps 3 to each other in articulated fashion. Joint elements 8 are designed as essentially plate-like components, which extend over the entire width of straps 3 and are flush with inner and outer side surfaces 9, 10. In this context, the width and length of the elastically deformable areas of joint elements 8 are a multiple of their thickness.

Joint elements 8 are located in laterally open recesses 11 of straps 3, which can be designed to be open towards inner and/or outer side surface 9, 10. Consequently, joint elements 8 can be inserted from the side of straps 3 into recesses 11 and fixed in them. Joint element 8 is elastically deformable in the angling direction of the chain links, exerting a restoring force, and acts in the manner of a leaf spring. Where appropriate, the joint element can also essentially exert no restoring forces. The middle, elastically deformable area 12 of joint elements 8 borders mounting areas 13 on both sides, which fit precisely against surfaces 14 of straps 3 that delimit recess 11. On the side facing away from middle area 12, mounting areas 13 display wider cross-sections 15, which engage an undercut in the strap, meaning that the joint elements are located in recess 11 in a manner preventing longitudinal shifting. The joint elements can absorb tensile forces. Independently of this, the joint elements are also prevented from pivoting transversely to the straps, to which end positive-fit means are again provided, in this case again by wider cross-section 15, which extends over the entire width of the joint elements. Furthermore, mounting areas 13 of the joint elements can display positive-fit means that interact with the straps and prevent joint elements 8 from shifting transversely to straps 3. The mounting area of the joint element, including the wider cross-section, is surrounded closely by the strap, or has an interference fit.

By designing the straps suitably, the joint element can be almost entirely relieved of tensile and/or compressive forces acting in the longitudinal and/or transverse direction of the chain, or it can at least partly absorb them itself. The tension-absorbing means of the straps can be designed as projections and undercuts that engage each other. The joint element is located half-way up straps 2, or also eccentrically, where appropriate. Straps 2 and joint elements 8, designed as separate components, consist of different plastic materials. At the height of joint elements 8, the face ends of the straps are provided with recesses 18 that are open towards the face end. Edge 19 of the strap, which delimits recess 18, is a distance away from joint element 8, both above and below it, making it possible to bend the joint element through a relatively large bending radius. To discharge electrostatic charges, bridging elements 30 are located or fastened on the joint elements, or integrated in them, only a few of them being shown.

FIG. 2 is a schematic representation of a section of the energy guiding chain according to FIG. 1 with joint elements 8, 8b, where joint element 8 is designed with a bridging element 30, which is located between the two mounting areas 13, projects at the two face ends 31 of the joint element, and is connected to the adjacent area 32 of side straps 3 in electrically contacting fashion. The bridging element is made of metal in this instance. For comparison, joint element 8b is shown without a bridging element.

FIG. 3 shows a modification of the energy guiding chain according to FIG. 1, where joint element 8a now extends over several straps in the longitudinal direction of the chain, connecting them to each other in articulated fashion. Provided between mounting areas 13a of joint elements 8a are connecting areas 13b, which display a smaller width than mounting areas 13a and are located in grooves in the straps. A plurality of joint elements 8a is provided to connect the straps of a strap strand to each other. It goes without saying that the joint element and the bridging element can extend over the entire chain length in this context. Bridging elements 30, which form electrical discharge devices, extend over several links and are preferably located at the height of connecting areas 13b, by which they can be supported or surrounded.

In the event of pivoting movement of the chain links relative to each other, contacting areas 37 of the bridging element do not change position relative to the respective contacting areas of the links. The mounting areas of the joint element, and the contacting areas of the bridging elements projecting from them and/or emerging from their surface, are in constant contact with the links during pivoting movement thereof, e.g. with the straps or cross-members of the links, where the contact suffices to enable the electrical discharge of charge carriers. It goes without saying that the bridging elements can be of suitable design to also result in electrical discharge to the chain links or their side straps at the level of wider cross-sections 15.

Thus, the joint element and the bridging element are particularly advantageously adapted to each other in such a way that they can be connected to the respective chain links as a structural unit. In this context, the joint element and the bridging element can be pre-assembled, or permanently connected to each other, or also merely joined together loosely in such a way that they can be fastened to the chain links in a common handling procedure.

Furthermore, the bridging elements can be designed to permit at least a certain degree of longitudinal displacement relative to the joint elements and/or links in the presence of sufficiently high forces in the longitudinal direction of the bridging elements, thereby avoiding tensile stressing or irreversible elongation of the bridging elements. To this end, the bridging elements can contact the joint elements and/or links in an interference fit.

FIG. 4 shows several modifications of joint elements with bridging elements.

Figure 4A:
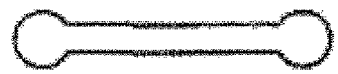
FIG. 4a shows an exemplary design of a joint element without a bridging element.

FIG. 4b shows a joint element 8, with a bridging element 30 that is essentially of plate-like design, covers the joint element on one side, and reaches over it at both face ends 31. The bridging element displays the same width as the joint element in this instance, but it can also have a smaller or, where appropriate, larger width. The joint element and the bridging element can be permanently fastened to each other, or merely pre-assembled by means of a suitable fit.

FIGS. 4c and 4d each show a joint element with a bridging element 30 projecting at both face ends 31, where projecting areas 37 represent contacting areas with the respective chain links. The bridging element is designed as a wire in each case. The bridging element is in each case located in non-positive and/or positive fashion in the integrally molded recess or groove 40 of the joint element. The recess can extend merely over mounting areas 13 and/or wider cross-sections 15, or also over middle area 41, which is deformed elastically during pivoting of the chain links. Vertically, the bridging element in each case ends roughly flush with the joint element or its mounting areas. Between the mounting areas, the bridging element projects vertically, meaning that contacting with the respective chain links or contact surfaces of the straps is again possible here in a simple manner. The chain links can be of plane design, or display an appropriately integrally molded groove to accommodate the bridging element, such that the bridging element simultaneously secures the joint element to prevent lateral displacement. The projecting contacting areas of the bridging element can be of different designs, e.g. cut off straight (FIG. 4c) or tapered towards the free ends (FIG. 4d).

FIG. 4e shows a joint element with several, in this instance three, bridging elements 30, located on one side of the joint element. The bridging elements each project at the face ends of the joint element, moreover projecting vertically on middle area 41 located between the mounting areas, in order to be connected to the associated chain link in electrically contacting fashion at this point.

In the event of locating the bridging elements on one side of the joint element, as according to FIGS. 4c to 4e, the bridging element is in each case preferably located on the side lying radially outwards in the deflection zone of the energy guiding chain or, where appropriate, also on the side lying radially inwards, i.e. the side of the joint element facing towards the centre of curvature.

According to FIG. 4f, different numbers of bridging elements 30 are located on upper and lower sides 36, 38 of joint element 8, again displaying contact areas 37 projecting at the face ends. Furthermore, the bridging elements are arranged in offset fashion relative to each other or with gaps, in order to avoid excessive reduction of the thickness of the joint element material. The bridging elements are again located in recesses or grooves 40 of the joint element, where the grooves can be provided with undercuts or the bridging element is retained in the grooves by an interference fit.

In FIG. 4g, bridging element 30 is completely surrounded by joint element 8, e.g. by molding-in in an injection molding process, and projects from the face ends of the joint element on both sides, meaning that only projecting areas 37 are in this instance designed as areas contacting the respective chain link. According to FIG. 4h, two or more bridging elements 30 can also be surrounded by the joint element, where the bridging elements are preferably laterally spaced apart from each other.

According to FIG. 4i, bridging element 30 is of strip-like design and again projects from joint element 8, vertically and/or at the face ends, at least in partial areas.

According to FIG. 4k, bridging element 30 surrounds joint element 8 at both face ends, forming a positive connection, such that joint element and bridging element form a structural unit. Bridging element 30 can, for example, be slid sideways onto the joint element, or its end areas are beaded. As a result, the bridging element is fastened positively to the joint element in both the longitudinal and/or transverse direction of the joint element. At the same time, a comparatively large contacting surface is provided for contacting connection to the respective chain link.

Figure 1:
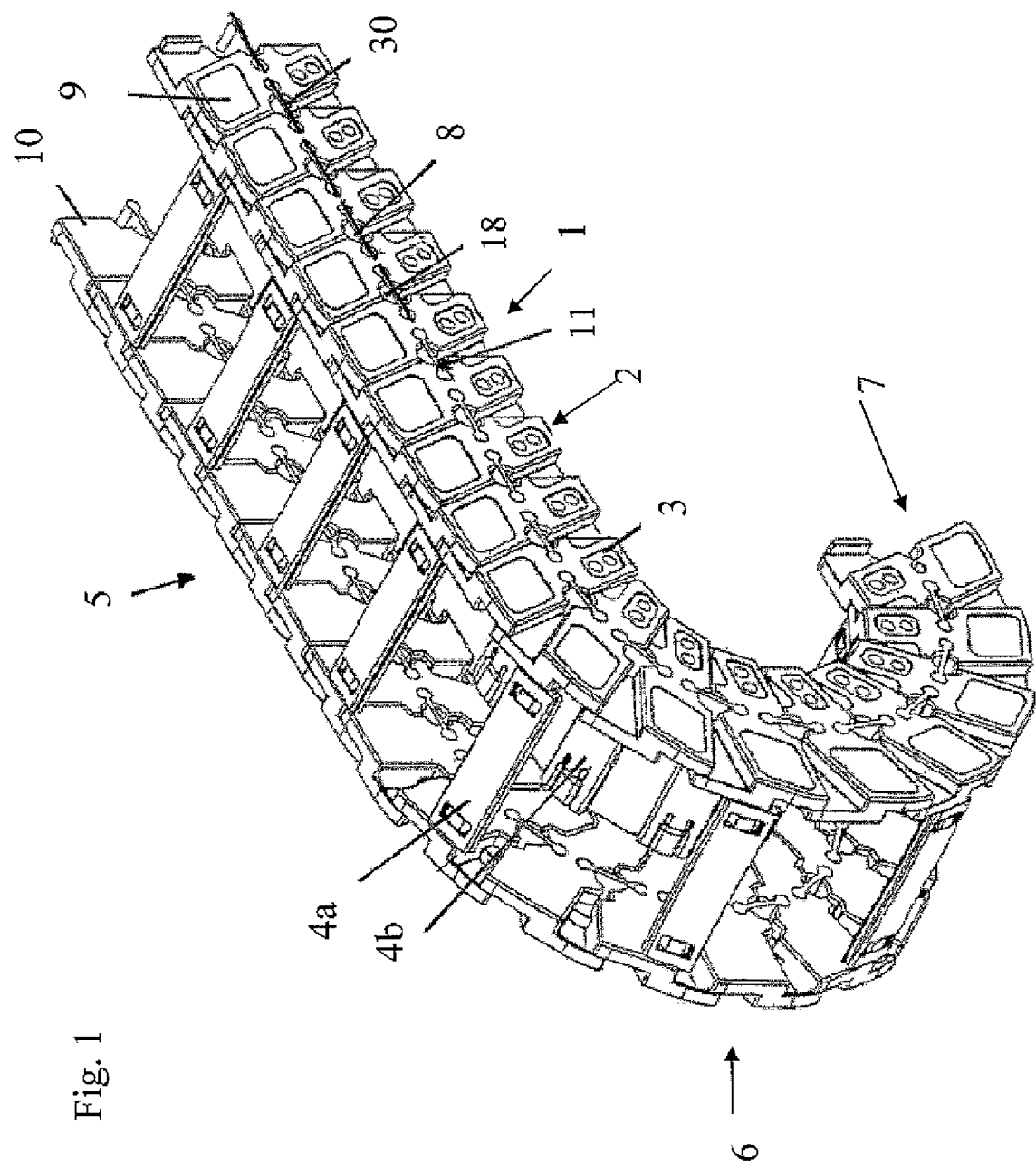
Figure 2:
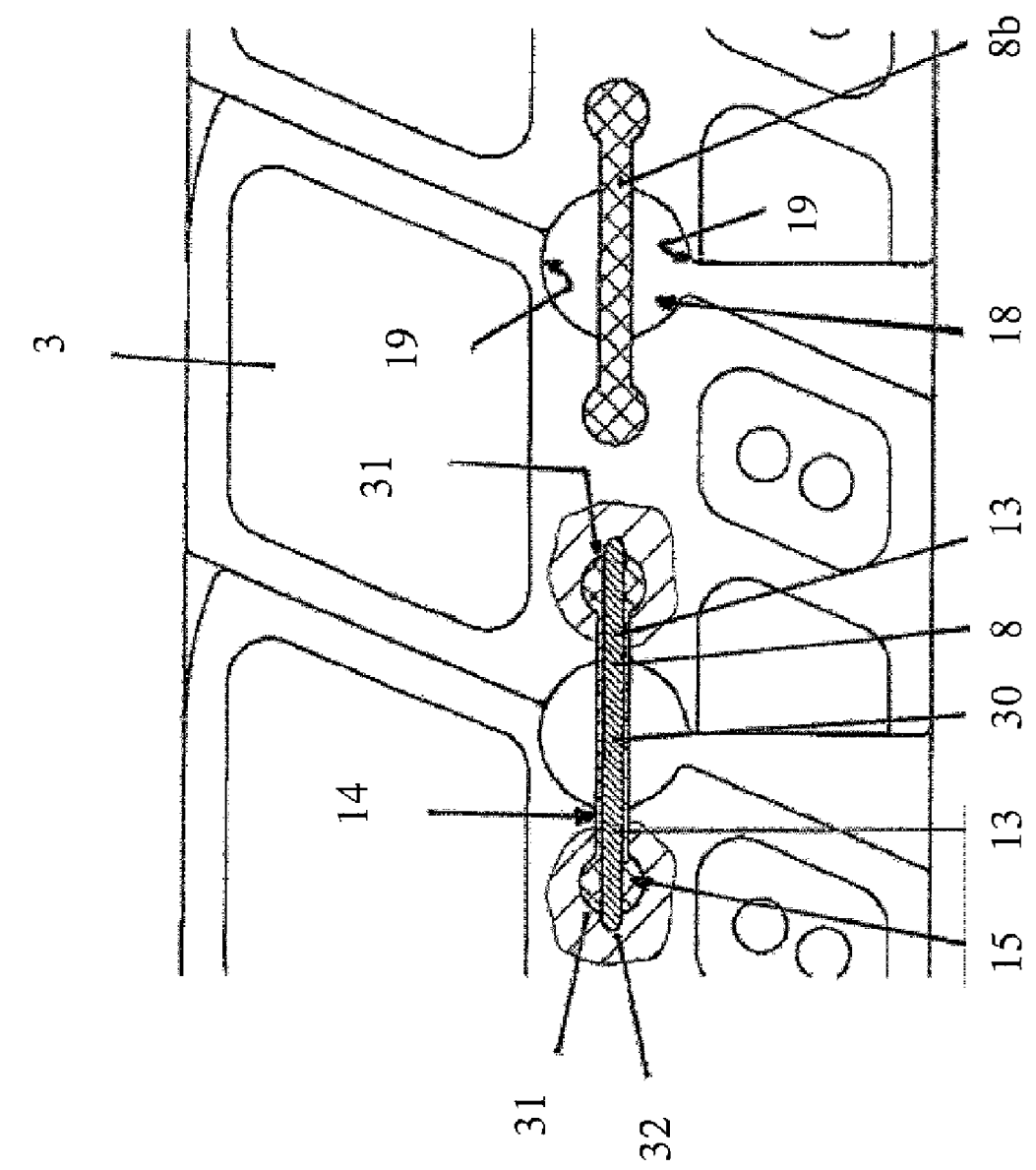
Figure 3:
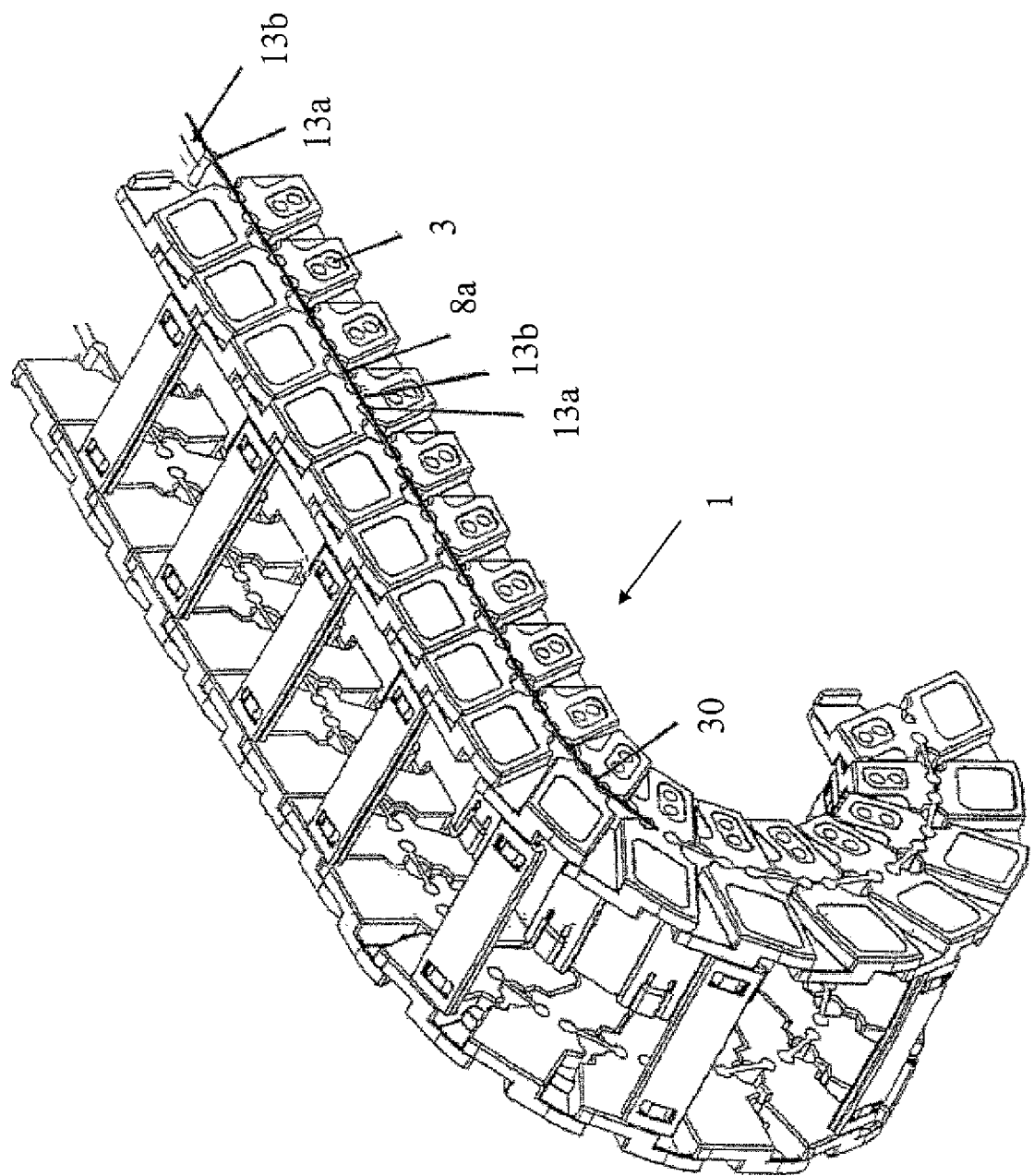

It goes without saying that the joint element with bridging element can also be modified appropriately if it also extends over several chain links. In this context, the bridging element can be at least partly supported or accommodated by connecting areas 13b (FIG. 3), to which end transitional areas 8a can likewise be provided with grooves for accommodating the bridging element, or can surround the bridging element.

Figure 5A:
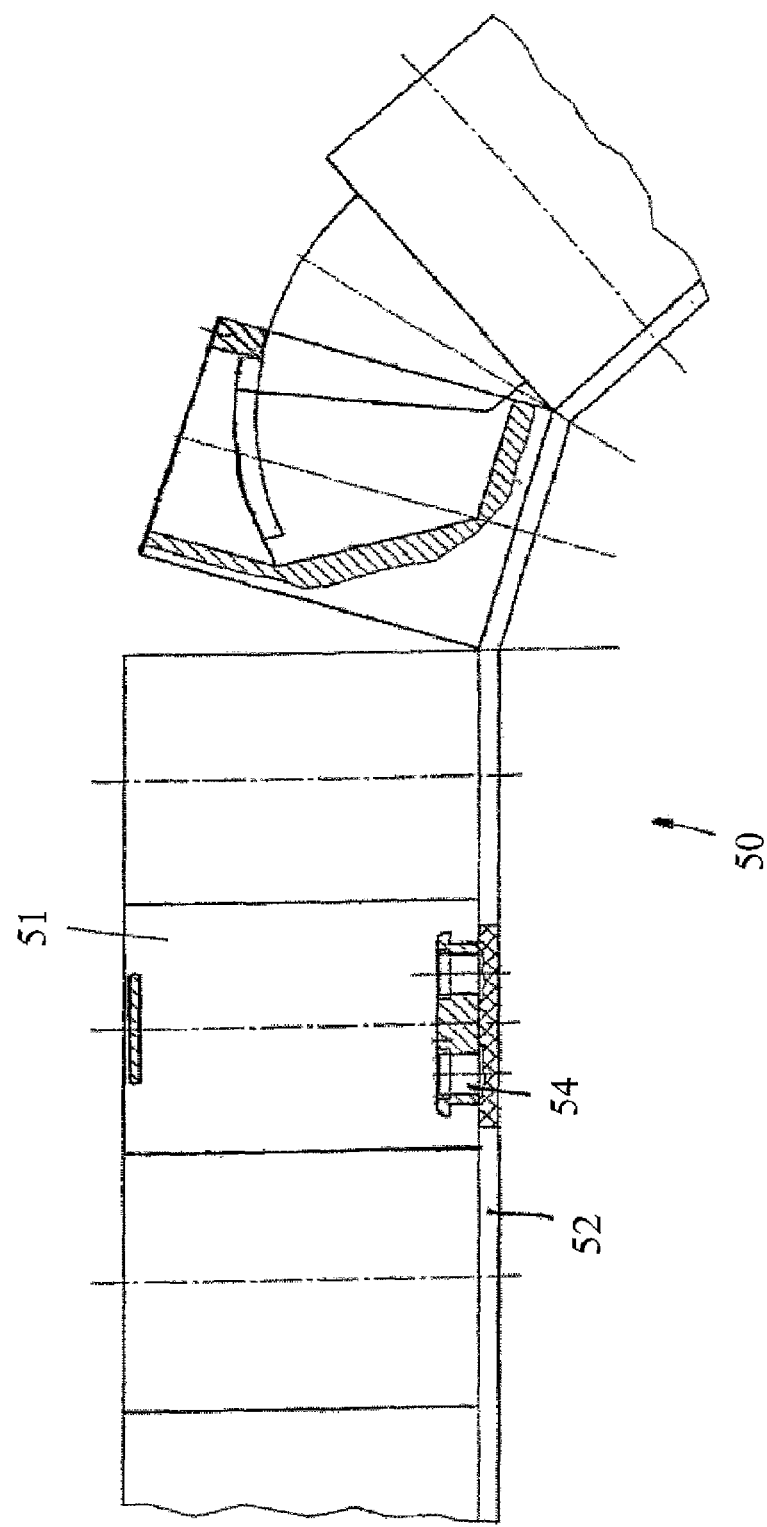
Figure 5B:
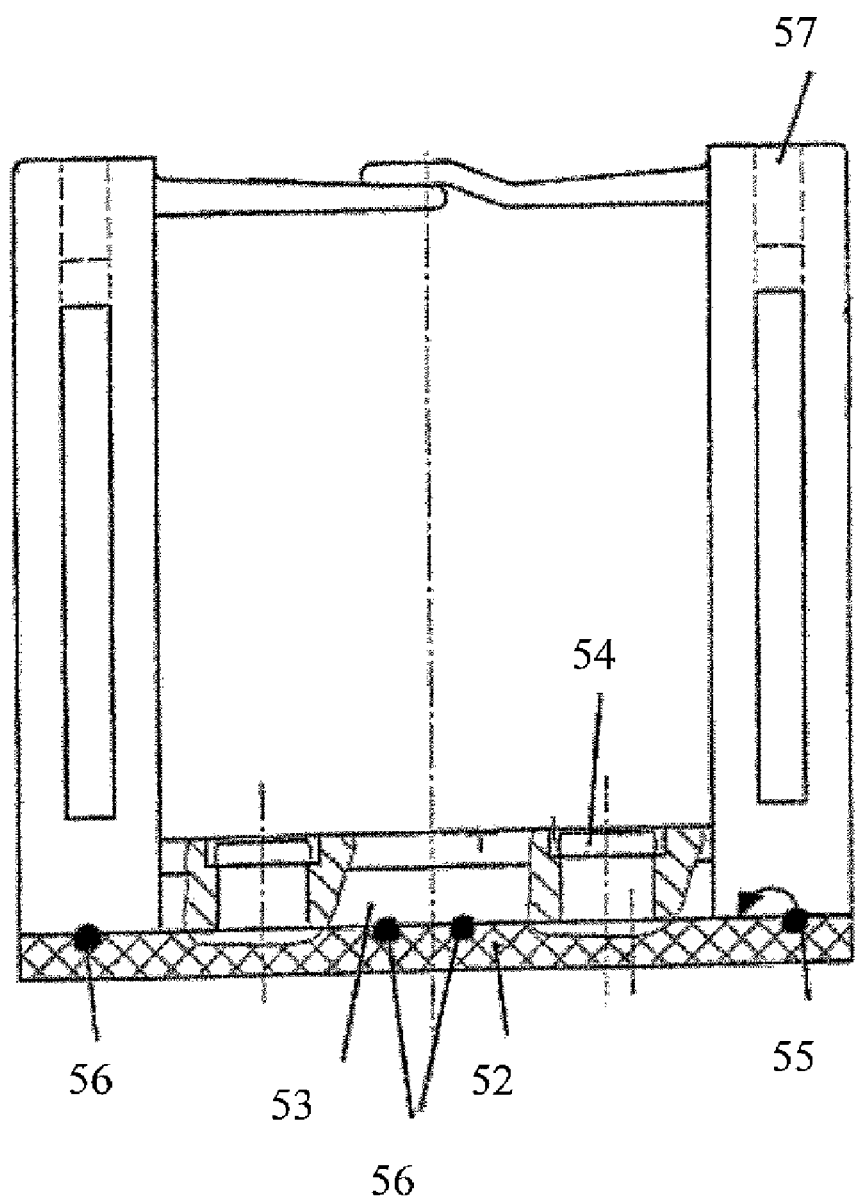

FIG. 5 shows an energy guiding chain 50, in which links 51 are fastened in detachable fashion to a joint strip 52 by means of snap tabs 54, where it goes without saying that connection in one piece is also possible. Joint strip 52 can be located with outer side 55 on the cross-members and/or bottom elements 53 or the lower cross-members of the chain links, so that, when the upper strand is deposited on the lower strand, joint strip 52 can slide on itself if the chain sags. Where appropriate, the joint strip can also be fastened on the side of the bottom elements facing towards the inside of the chain.

As illustrated in FIG. 5, joint strip 52 can likewise be provided with one or more bridging elements 56, which likewise extend in the longitudinal direction of the chain. In this context, the bridging element can display the length of the strip-like joint element or, where appropriate, also the length of the energy guiding chain as a whole. Again, the bridging element preferably projects vertically from the joint element in order to provide contacting areas opposite the chain links or the bottom elements, which are preferably fastened to the joint element in detachable fashion. Where appropriate, the bridging elements can again be at least partly, or completely, surrounded by the strip-like joint element. In this context, sections of the bridging elements can emerge at the surface of the joint element, or they can be completely surrounded by it over its entire length, to which end the joint element can be molded around the bridging elements, for example. As indicated, the bridging elements can also be located in positive and/or non-positive fashion in grooves or recesses in the joint element and/or the bottom elements or side straps 57 and contact these elements in each case.

It goes without saying that, where appropriate, two or more links can be fastened next to each other on a joint strip, where the links can project laterally from the joint strip, or not, and are in electrically conductive contact with the joint strip via bridging elements, similarly to the illustration in FIG. 5.

List of Reference Numbers

1 Energy guiding chain
2 Chain link
3 Strap
4a,4b Cross-member
5 Upper strand
6 Deflection zone
7 Lower strand
8, 8a Joint element
9, 10 Side surface
11 Recess
12 Middle area
13,13a Mounting area
13b Connecting area
14 Surface
15 Wider cross-section
16, 17 Face end
16a Groove
18 Recess
19 Edge
20-23 Overlapping area
24 Middle area
24a Web
24b Recess
25-28 Projection
28a Stop face
29 Damping strip
29a Web
30, 31 Recess
35-38 Curved section 40, 41 Upper side
45 Gap
50-53 Stop
55, 56 Limiting surface
60 Joint element
61 Mounting area
62 Middle area
70 Joint element
71 Mounting area
72 Connecting area
73-78 Middle joint area
75a Material strand
75b Cavity
E Principal plane of the strap
R Direction
W1, W2 Angle

The invention claimed is:

1. Joint element for an energy guiding chain for guiding hoses, or cables, with a number of chain links displaying opposite side straps, where upper and lower cross-members are provided on at least some of the side straps, where the joint element displays at least two mounting areas that can be connected to adjacent or spaced chain links in order to connect them to each other in articulated fashion, so that the energy guiding chain can be deposited to form a lower strand, a deflection zone and an upper strand, characterized in that a bridging element, which continuously bridges the at least two mounting areas and is made of a material whose conductivity is greater than that of the joint element material, is located on the joint element, and in that the bridging element displays at least two contact areas, located on the surface of the joint element, each of which can be connected in electrically contacting fashion to the two chain links assignable to the two mounting areas.

2. Joint element according to claim 1, characterized in that the bridging element projects, on one side or both sides, beyond the mounting areas of the joint element in the longitudinal direction thereof, and can in each case be connected to a chain link by the projecting area in electrically contacting fashion.

3. Joint element according to claim 1, characterized in that the bridging element stands proud of the surface of the joint element and/or projects laterally beyond it, and in that the proud and/or laterally projecting area can in each case be connected to a chain link in electrically contacting fashion.

4. Joint element according to claim 1, characterized in that the bridging element at least partially covers the surface of the joint element, and in that the covering area can be connected to a chain link in electrically contacting fashion.

5. Joint element according to claim 1, characterized in that the bridging element is at least partly inserted in one or more recesses in the joint element and projects from the joint element vertically and/or in the longitudinal direction, at least in some areas.

6. Joint element according to claim 5, characterized in that the at least one recess is provided at least at the height of the mounting area of the joint element and/or extends over the entire length of the joint element.

7. Joint element according to claim 5, characterized in that the at least one recess is designed as a groove that preferably extends over the entire length of the joint element.

8. Joint element according to claim 1, characterized in that the bridging elements project vertically from the joint element not at the level of the mounting areas of the joint element, but between them.

9. Joint element according to claim 1, characterized in that the bridging element is at least partly, or completely, surrounded by the joint element over part of its length or its full length, and emerges or projects from it, at areas that are spaced apart, in such a way that these areas can be connected to different chain links in electrically contacting fashion, where the bridging element preferably emerges or projects at the two opposite face ends of the joint element.

10. Joint element according to claim 1, characterized in that, in assembled state, bridging elements are provided on the upper and lower side of the joint element, being connectable in each case to chain links in electrically contacting fashion.

11. Joint element according to claim 1, characterized in that several bridging elements are in each case provided on the upper and/or lower side of the joint element, where bridging elements located on the upper and lower side of the joint element are preferably arranged in laterally offset positions relative to each other.

12. Joint element according to claim 1, characterized in that different numbers and/or different designs of bridging elements are provided on the upper and lower side of the joint element.

13. Joint element according to claim 1, characterized in that the bridging elements reach over the joint element at one or both face ends, preferably in such a way that the bridging element is retained on the joint element by forming a positive fit.

14. Joint element according to claim 1, characterized in that the respective bridging element is designed in the form of a wire or a strip.

15. Joint element according to claim 1, characterized in that the bridging element is made of a metallic material, where the joint element is preferably made of a plastic material.

16. Joint element according to claim 1, characterized in that the bridging element is of elastically deformable or plastically deformable design.

17. Joint element according to claim 1, characterized in that the joint element and the at least one bridging element, or all bridging elements, extend over several associated chain links and can in each case be connected to them in electrically contacting fashion.

18. Joint element according to claim 1, characterized in that the joint element is of web-like or strip-like design and can be fastened to the side straps of the chain links, preferably in lateral recesses thereof, in electrically contacting fashion.

19. Joint element according to claim 1, characterized in that the joint element is of strip-like design and displays mounting areas that can be fastened to the cross-members of the chain links and/or to the undersides of the side straps, where the joint element can be fastened to the side of the cross-members facing towards the inside of the energy guiding chain, or to the side facing away from it.

20. Joint element according to claim 1, characterized in that the joint element can be fastened to the chain links in detachable fashion, or is designed in one piece with them.

21. Energy guiding chain for guiding lines and cables between two consumers, at least one of which is moveable, where the energy guiding chain displays a plurality of chain links connected to each other in articulated fashion, each of which displays opposite side straps, and where upper and/or lower cross-members connecting the side straps and forming a cable guiding duct are provided on at least some or all of the chain links, where the chain links are in each case connected to each other via at least one hinge joint that permits pivoting of adjacent links relative to each other, forming a lower strand, a deflection zone and an upper strand, and where the links at least partly consist of an electrically conductive material that enables the discharge of electrical charges over at least part of the chain length, characterized in that the chain links are connected to each other by a joint element according to claim 1 in such a way that the bridging element in each case connects adjacent or spaced chain links to each other in electrically contacting fashion.

22. Energy guiding chain according to claim 21, characterized in that the bridging element extends over several chain links and connects them to each other in electrically contacting fashion, forming a continuous, uninterrupted conduction path.

23. Energy guiding chain according to claim 21, characterized in that the joint element is arranged in such a way that it is deformed under bending and/or torsional stress during pivoting movement of the links.

24. Energy guiding chain according to claim 21, characterized in that the joint element interacts with the chain links in such a way that the joint element is secured, or additionally secured, by the at least one bridging element to prevent lateral displacement relative to the chain links.

25. Energy guiding chain according to claim 21, characterized in that, in the event of pivoting of the chain links relative to each other, the contacting areas of the bridging element and/or the mounting areas of the joint element are arranged immovably relative to the respectively associated chain link.

* * * * *